Aug. 23, 1960  J. S. ARCUS, SR  2,949,802
PASS PUNCH HAVING GRIPPER AND AUTOMATIC ACTUATING MEANS
Filed Feb. 14, 1957  10 Sheets-Sheet 1

INVENTOR.
JAMES S. ARCUS, SR.
BY Gustav Drews
his ATTORNEY

Aug. 23, 1960 J. S. ARCUS, SR 2,949,802
PASS PUNCH HAVING GRIPPER AND AUTOMATIC ACTUATING MEANS
Filed Feb. 14, 1957 10 Sheets-Sheet 5

INVENTOR.
JAMES S. ARCUS, SR.
BY
his ATTORNEY

Aug. 23, 1960     J. S. ARCUS, SR     2,949,802
PASS PUNCH HAVING GRIPPER AND AUTOMATIC ACTUATING MEANS
Filed Feb. 14, 1957     10 Sheets-Sheet 7
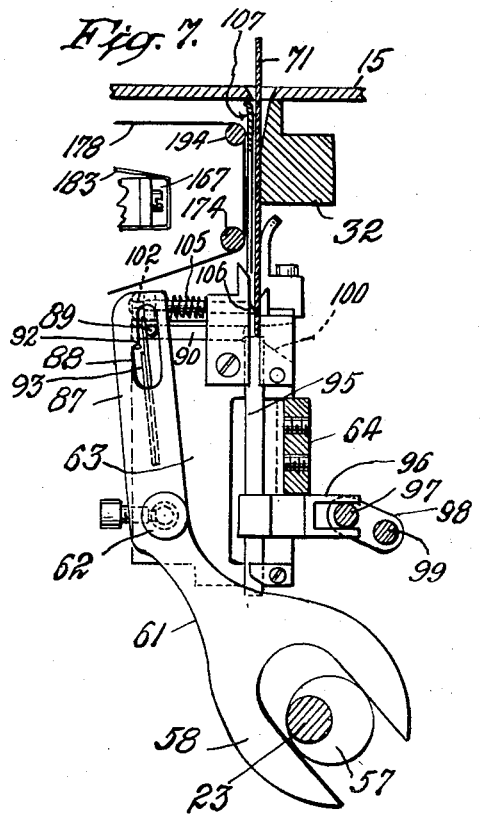
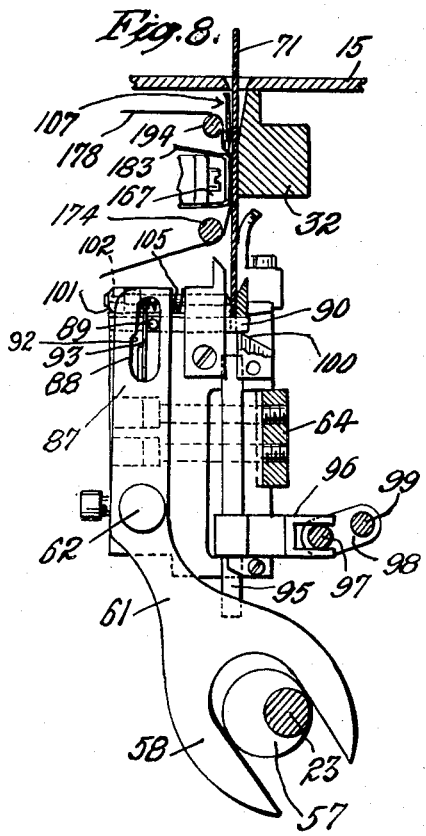
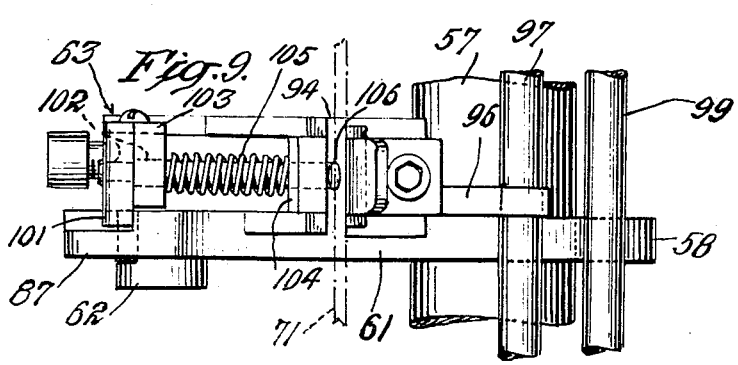
INVENTOR.
JAMES S. ARCUS, SR.
BY Gustav Drews
his ATTORNEY

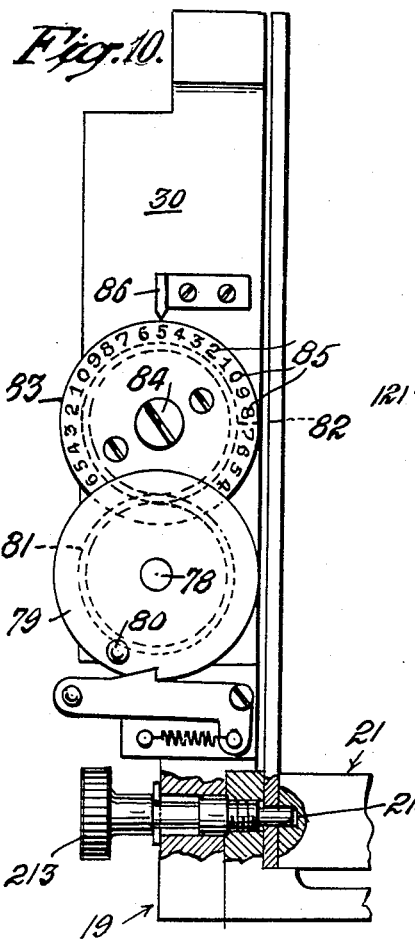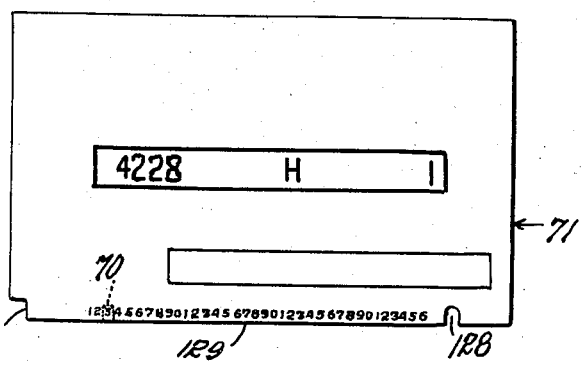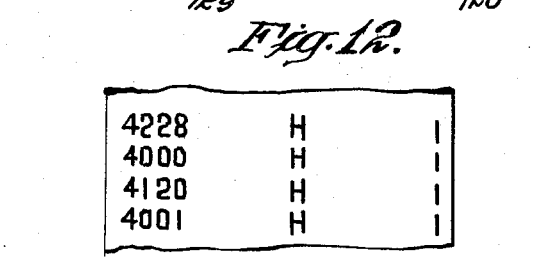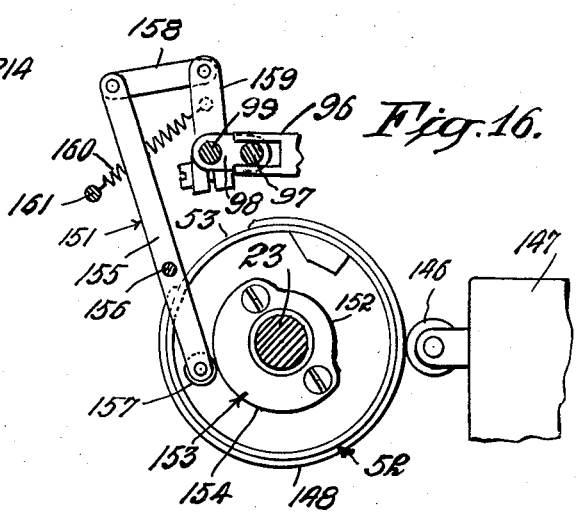

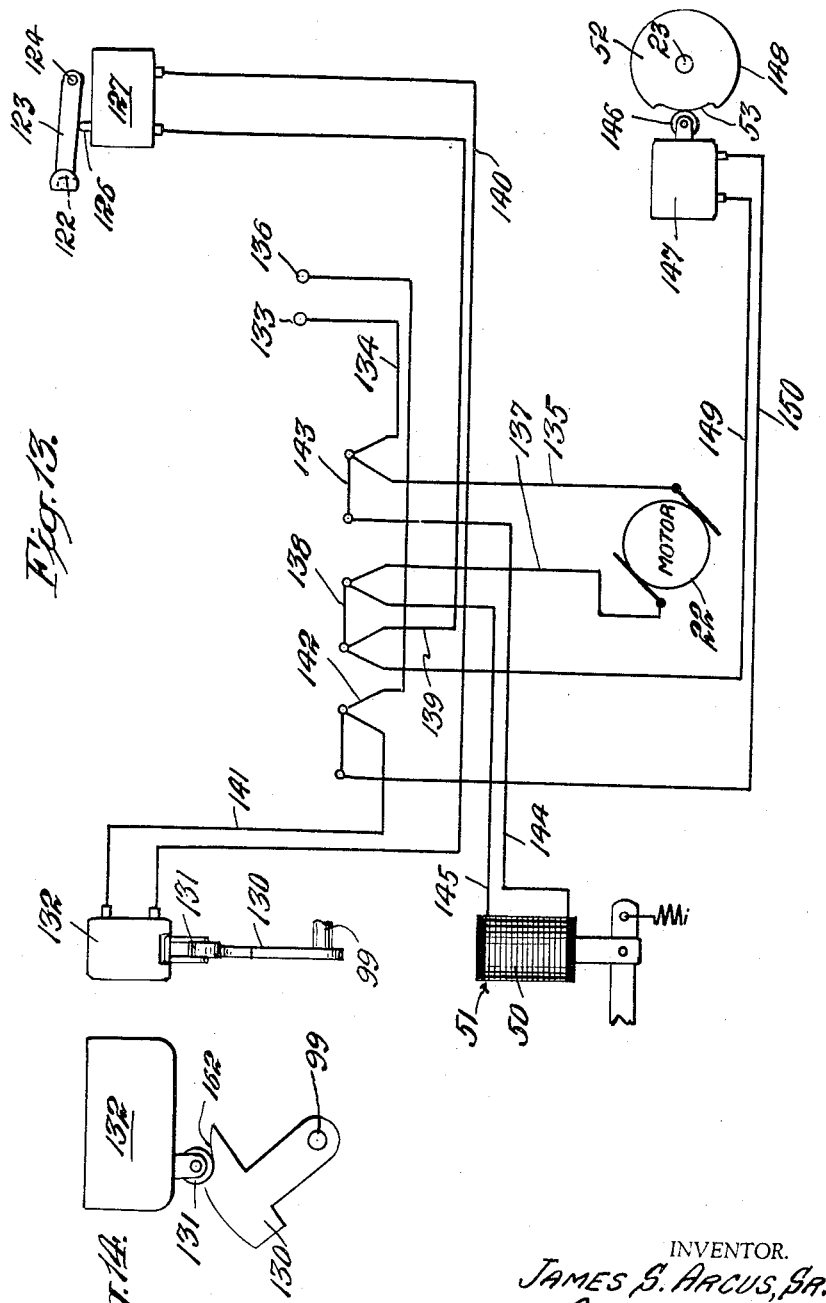

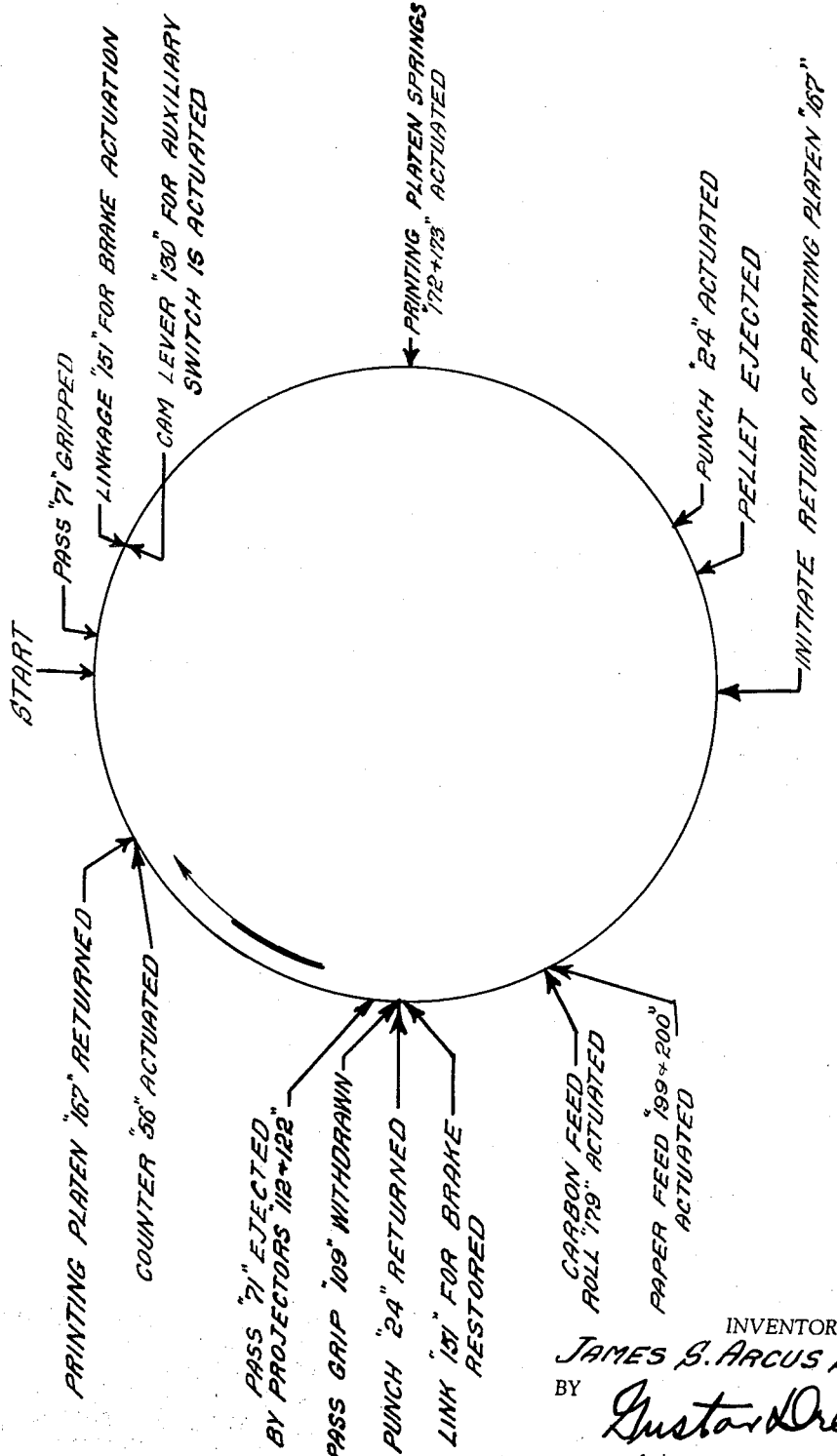

United States Patent Office 2,949,802
Patented Aug. 23, 1960

2,949,802

PASS PUNCH HAVING GRIPPER AND AUTOMATIC ACTUATING MEANS

James S. Arcus, Sr., 2641 NE. 26th Terrace, Fort Lauderdale, Fla.

Filed Feb. 14, 1957, Ser. No. 640,206

2 Claims. (Cl. 83—364)

This invention relates to an improved admission pass manipulating machine such as disclosed in United States Letters Patent No. 2,799,337, issued July 16, 1957, and Nos. 2,741,979 and 2,741,980, both issued April 17, 1956, to James S. Arcus, Sr.

As set forth in the applications for patent referred to in the entertainment field, such as sporting events, including horse racing meets, and the like, it has been conventional to issue passes to a number of groups of attendants and patrons of a race track, and the like. Record of the use of such passes for each day of each meet has been required for a number of reasons, as an instance, to provide against misuse of the passes by unauthorized persons, to prevent use of a single pass for more than one admission, thereby in turn to detect whether such pass had been transferred to an unauthorized person to gain admission after the authorized user had been admitted, and to determine lists of the passes which are taxable at different rates, and those which are not taxable.

In the invention disclosed in Patent No. 2,741,980 it was sought to obtain the object set forth by a manually operated mechanism. With a view to simplifying that construction and materially reducing the mechanism required, the invention disclosed in Patent No. 2,741,979 provided a machine mainly relying upon electric motive power in which a ticket or pass, when received by the machine, if an acceptable ticket, at the beginning of a cycle will actuate an electric switch to establish the circuit for an electric motor, as a result of which the mechanism operatively connected with the motor will be actuated to perform the several steps of a single cycle, including the actuation of a switch lock and the eventual release of the switch lock at the end of the cycle.

In Patent No. 2,799,337, provision was made to provide a mechanism of the type illustrated in Patent No. 2,741,979 in which (1) a single starting switch when actuated will initially establish the current to the motor of the main drive, and also to a solenoid which controls the brake shoe for a brake drum on the main drive positively to release the main drive for free actuation during a cycle; (2) the main drive when so actuated will in turn positively actuate a locking device to lock the single starting switch in circuit-establishing position and also close a second switch parallel to said starting switch, said main drive then maintaining the locking switch for said starting switch in locked position until shortly before the end of the cycle and also maintaining said second switch in closed position until after the locking mechanism for said starting switch has been positively actuated to open said starting switch; and (3) said second switch maintaining the circuit for said motor and solenoid after said starting switch has been opened to enable said main drive to continue to operate and finally liberate said second switch to enable it to open.

Due to the fact that it has been found that attempts have been made to tamper with machines of the aforesaid type, it is one of the objects of the present invention to obstruct the successful tampering with these machines. As an instance, it was found that some operators were quick enough to insert a pass and to initiate the start of the machine and withdraw the pass before the punch of the machine was able to operate upon the pass, and in turn also before the printing mechanism could cooperate with the pass to reproduce the notation on the pass. As a result, the pass would remain unpunched and could be used repeatedly by unauthorized parties and, furthermore, the record strip would not have impressed upon the same the notation of the pass so introduced and consequently the attendant would be in position to cheat the race track out of its admission fee and, of course, the Government would be deprived of its tax.

In an endeavor to overcome this filching, one of the objects of the present invention is to provide a machine which will lock the pass in the machine the moment that it is inserted and hold it so locked until the pass has been punched and a record made of the notation on the same.

More specifically, since the accumulation of pellets punched from the passes were responsible for jamming the machine and interfering with its proper operation, the object of the present invention is positively to eject each punched-out pellet immediately after it has been punched out and thereby positively prevent the accumulation of pellets in the punch.

More specifically, it is also an object of the present invention to provide a plurality of switches for cooperation with different parts of the pass so that the authorized pass will be required to have a plurality of switch operating conformations whereby all of the switches to be closed must be closed before the machine can operate and the actuation of any one of these switches to the actuation of any of the other necessary switches will be necessary to effect the operation of the machine.

It is still another object of the present invention to provide a case for the machine which will prevent access to the working parts of the machine, and which case cannot be opened.

These and other features, capabilities and advantages of the invention will appear from the subjoined detailed description of one specific embodiment thereof illustrated in the accompanying drawings, in which:

Figs. 7 and 8 are successive positions of the punch partly in section in side elevation.

Fig. 9 is a plan view of Fig. 7.

Fig. 10 is a front elevation of the dial system for operating the rack.

Fig. 11 is a plan view of a pass.

Fig. 12 is a fragmental plan view of a portion of the tape with records on the same.

Fig. 13 is a wiring diagram of the mechanism used for the machine.

Fig. 14 is a fragmental side view of one of the main switches illustrated in Fig. 13 in end view.

Fig. 15 is a diagram or chart showing the several operations of the machine in relation to one another.

Fig. 16 is a fragmental section showing the linkage in full lines which are partly shown in dotted lines in Fig. 5.

Casing 1

Figure 1:
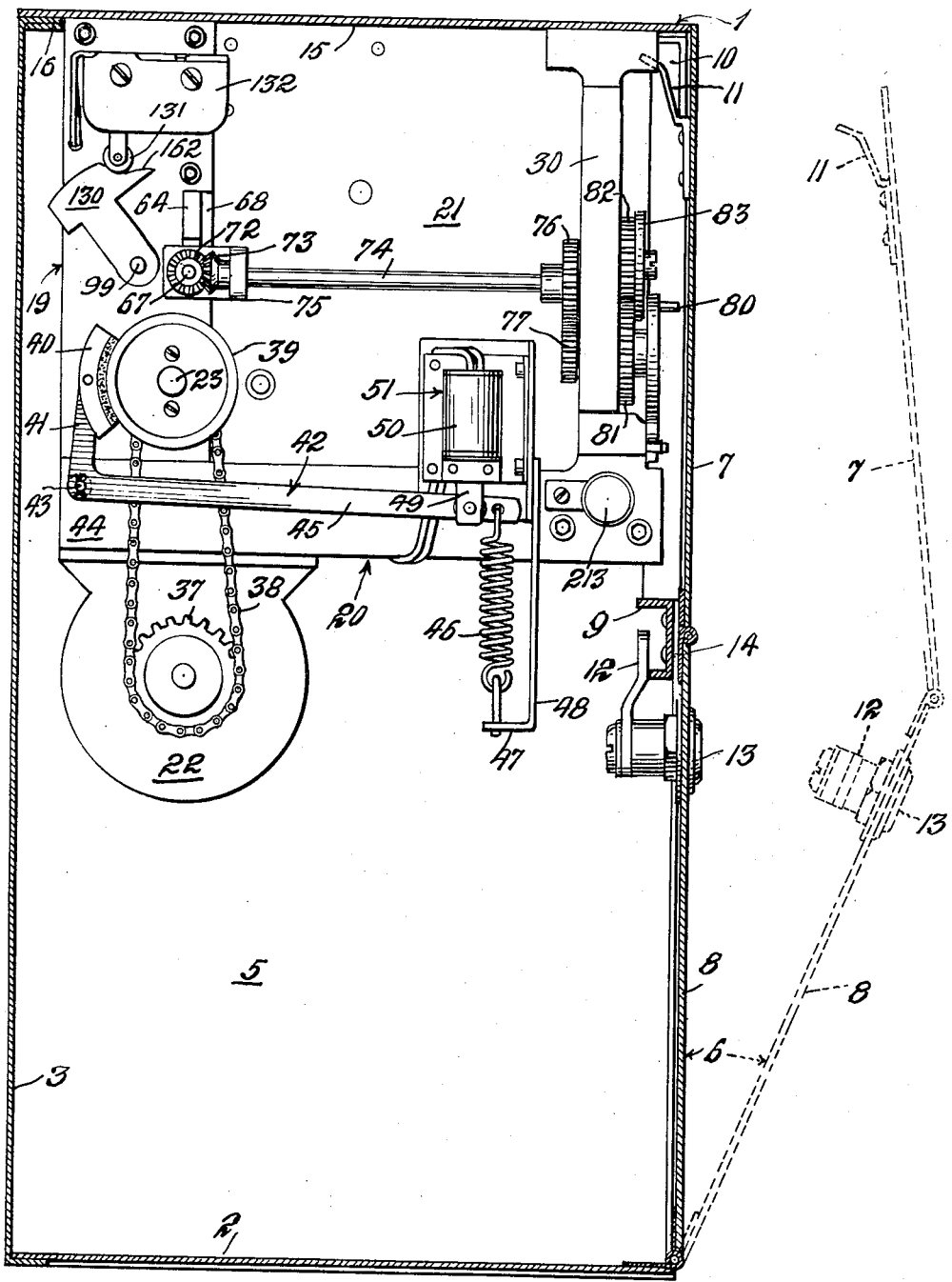
Fig. 1 is a side elevation with the case in section.

In the embodiment illustrated there is shown a case or casing 1 having a base 2, a rear wall 3, two side walls 4 and 5, and a door 6 composed of two sections 7 and 8, which are pivotally connected to one another with the lower section 8 pivotally connected to the front edge of the base 2. Across the front intermediate portions of the walls 4 and 5, there extends the crosspiece 9 and from the upper front end of each of the walls 4 and 5 there extend toward one another the projections 10. The upper section 7 of the door 6 has fingers 11 which extend to the rear of the projections 10 when the door 6 is closed, as shown in Fig. 1, and the arm 12 of the lock 13 swings up along the rear edge of the flange 14 of the crosspiece 9 when the lock 13 is turned into locked position, that shown in full lines in Fig. 1. The arm 12 clears the flange 14 in unlocked position of the lock 13, see the dotted line position of the arm 12 in Fig. 1.

The cover plate 15 is secured to the flanges 16 and 17 of the side walls 4 and 5 by screws 18 or the like. The frame 19 of the machine 20, now to be described, is connected to the plate 15 by the screws, or the like, and hangs from the plate 15 in operative position. Consequently, in order to gain access to the working parts of the machine 20, it will be necessary to actuate the lock 13 to open the door 16 or else to free the plate 15 from the casing 1 and lift the machine 20 up from the casing 1 with the plate 15 secured to the machine 20. As a result of the aforesaid, tampering with the mechanism of the machine 20 will be materially reduced, if not entirely eliminated.

Machine frames 19 and 21

The machine 20 is composed of two main parts, one part connected to the frame 19 and the other to the frame 21. The operative parts in the frame 19 consist essentially of the motor 22, the cam shaft 23, the punch 24, and the pass receiving guide 25, while the operative parts in the frame 21 consist essentially of the printing mechanism 26.

The frame 19, see Figs. 1, 2, 3 and 6, consists essentially of the base plate 27, the two rear cheek plates 28 and 29, and the two front uprights 30 and 31, both extending upwardly from the base plate 27. The cheek plates 28 and 29 have extending from one to the other the upper cross bar 32.

Figure 2:
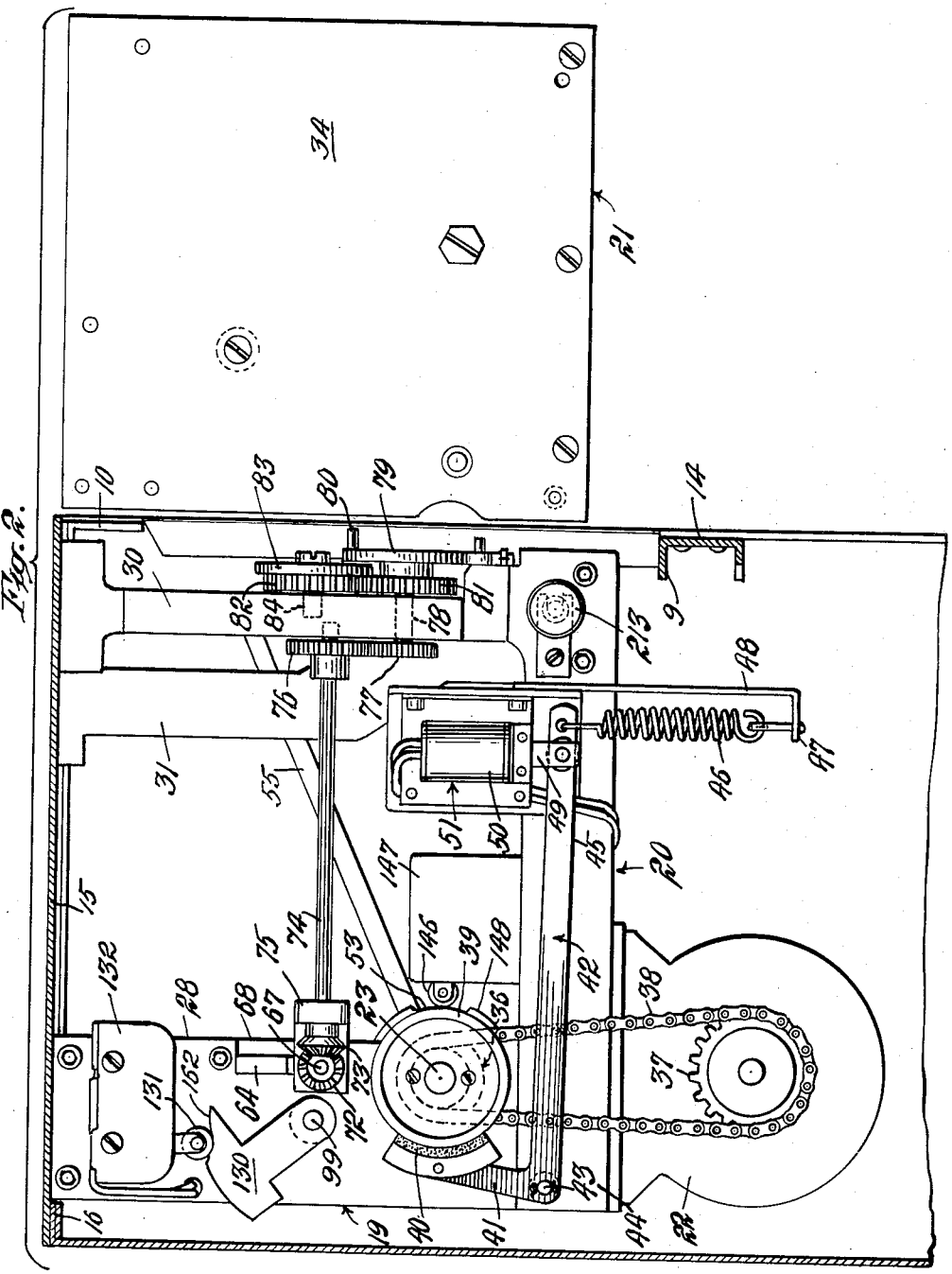
Fig. 2 is a side elevation, similar to Fig. 1, with the carriage containing the printing mechanism removed.
Figure 3:
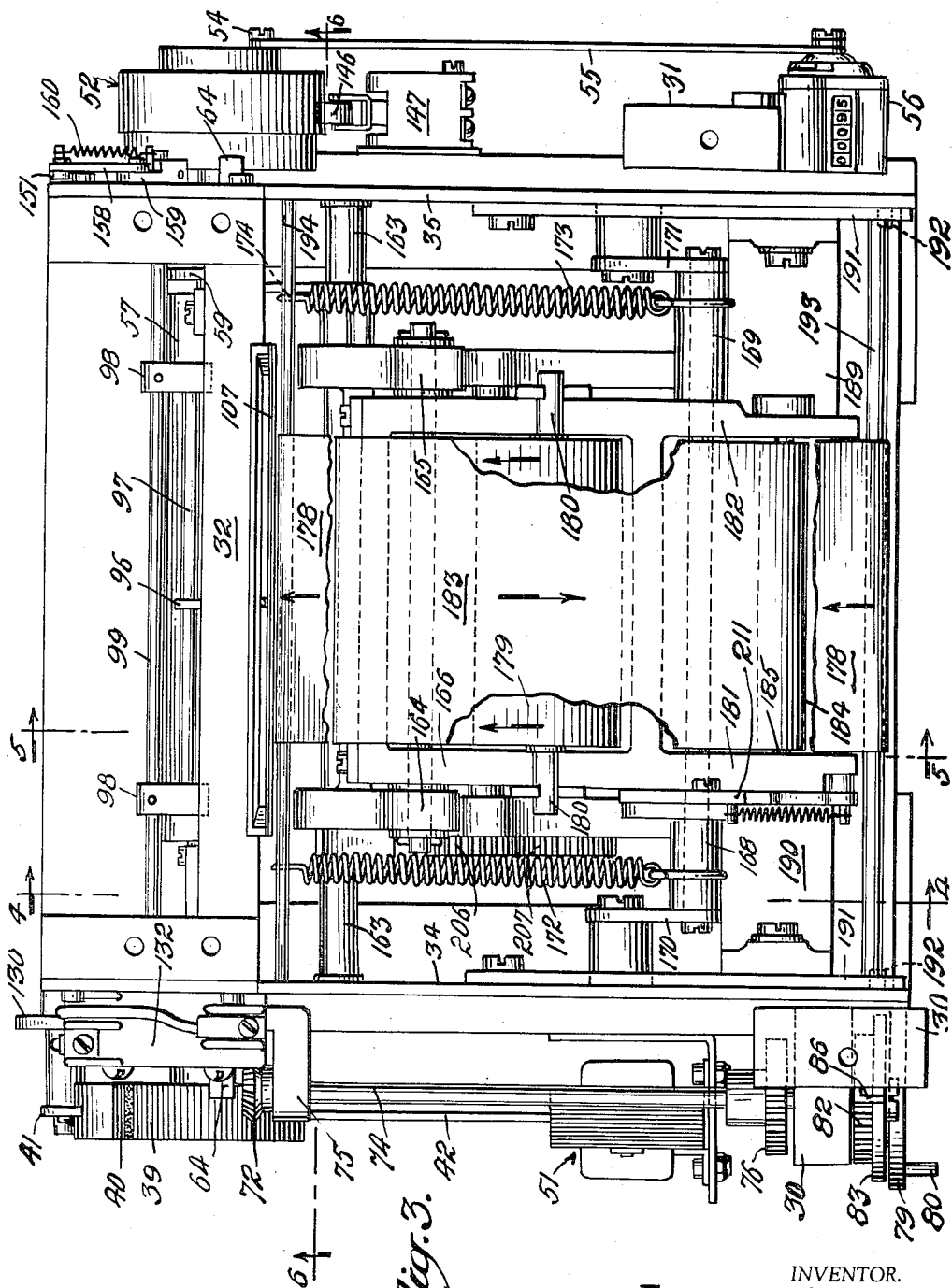
Fig. 3 is a plan view with the case and top removed but with the carriage and printing mechanism in position.
Figure 4:
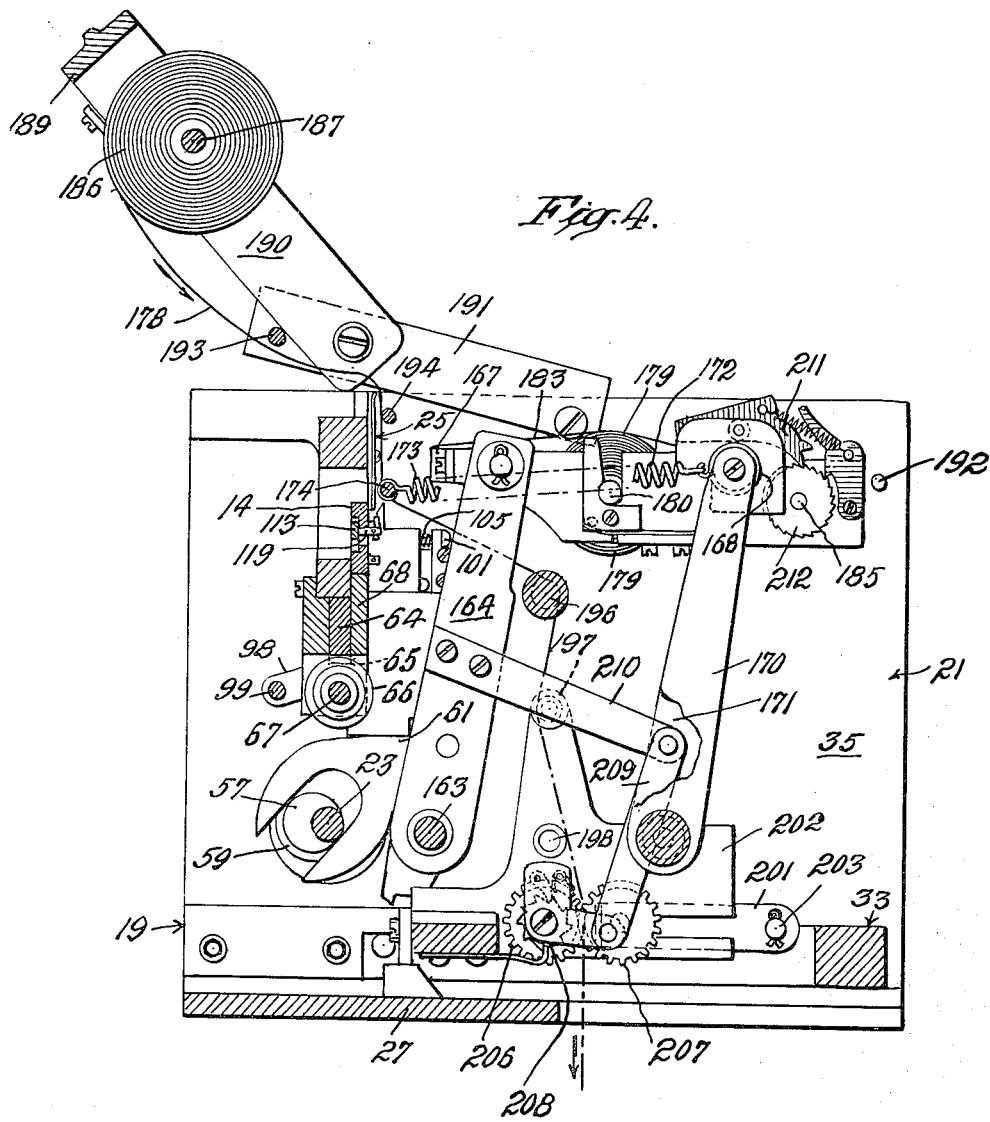
Fig. 4 is a section on line 4—4 of Fig. 3 with the paper roll in raised position and on a smaller scale than Fig. 3.
Figure 5:
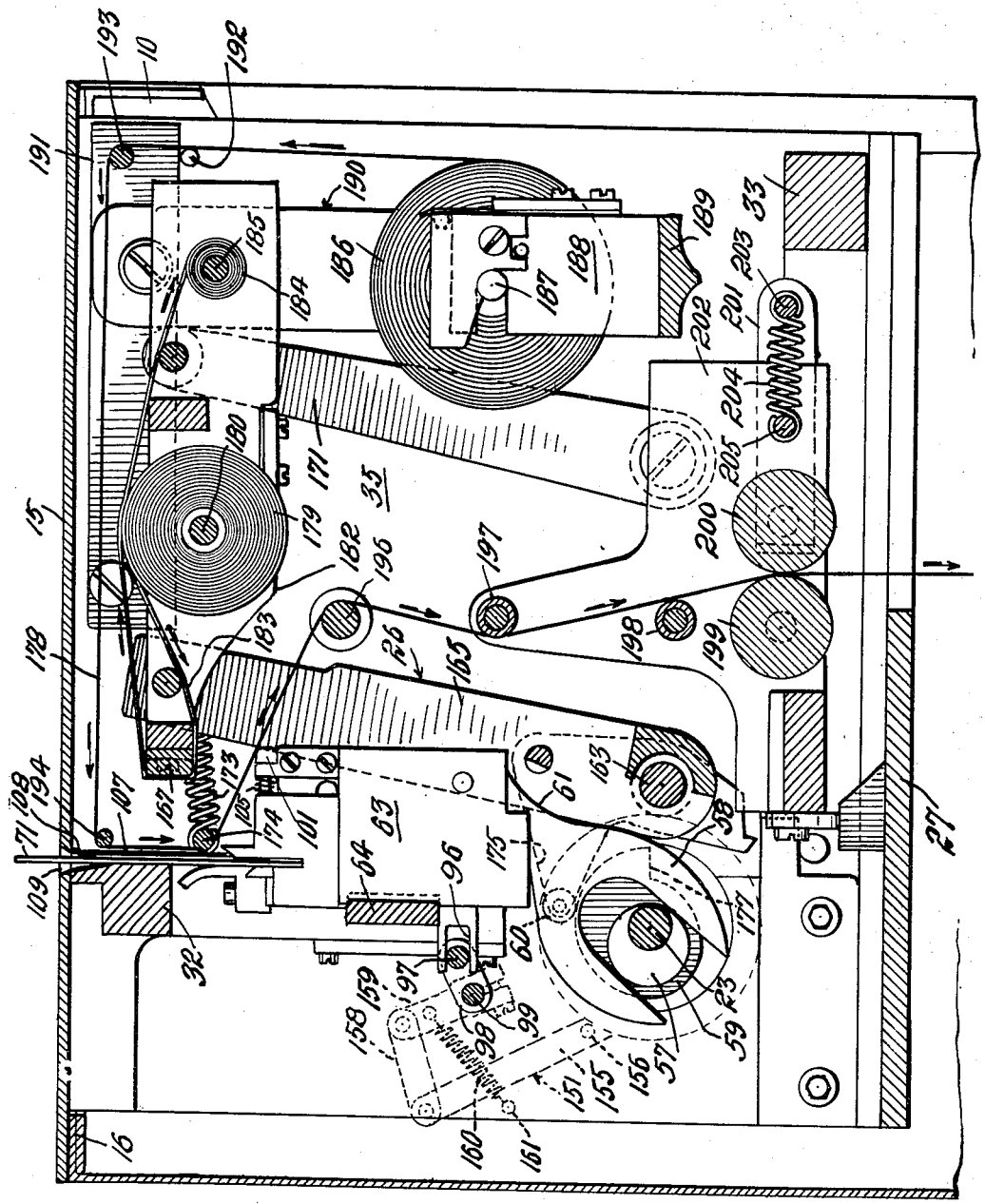
Fig. 5 is a section on line 5—5 of Fig. 3 with the paper roll in its lowered normal position but on the same scale as Fig. 3.
Figure 6:
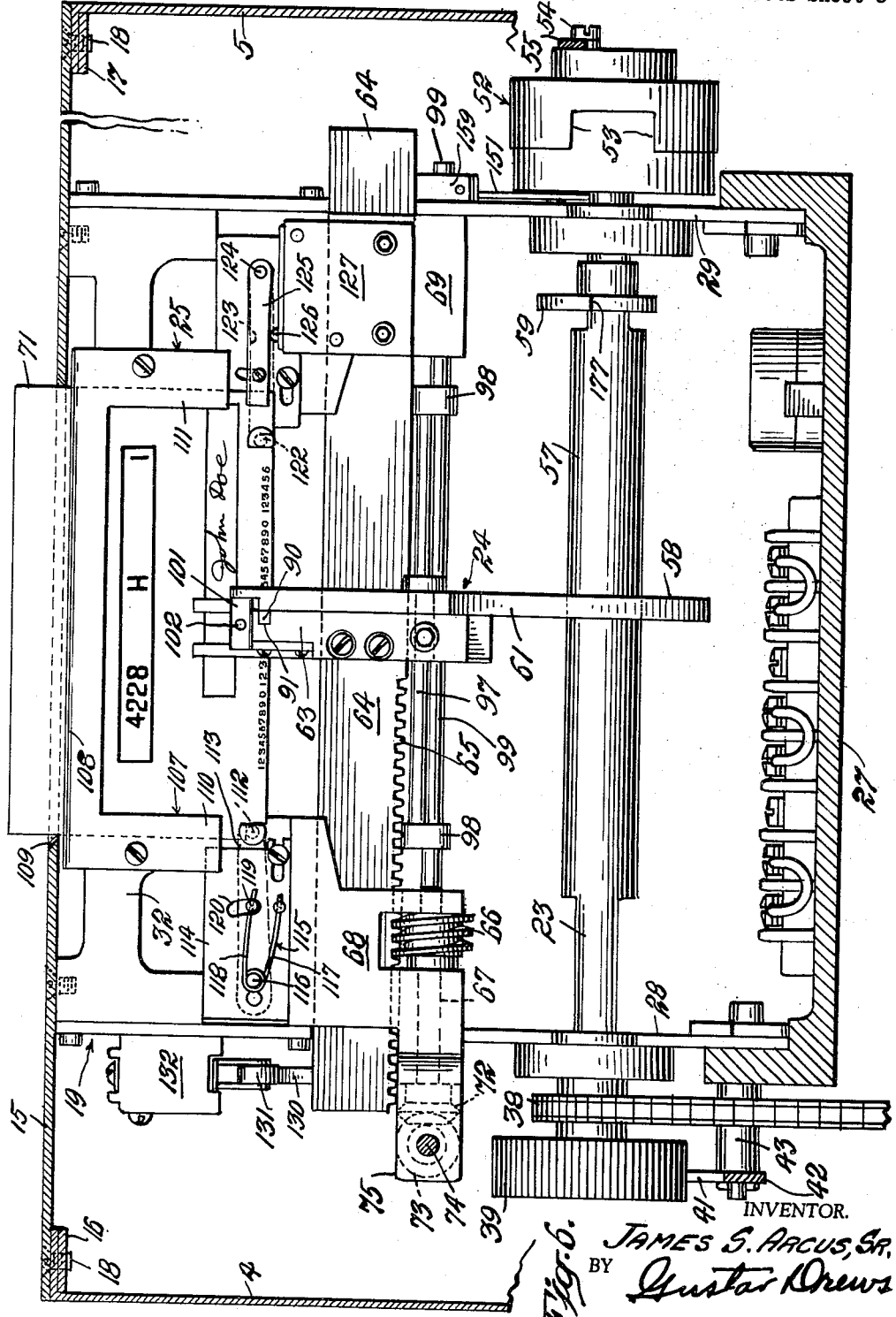
Fig. 6 is a section on line 6—6 of Fig. 3 and on the same scale as Fig. 3.

The frame 21, see Figs. 2, 3 and 4, consists essentially of the rectangular base 33 and the side cheek plates 34 and 35.

Main drive

The main drive consists essentially of the cam shaft 23, journaled in the cheek plates 28 and 29, having between the cheek plate 28 and the side wall 4, the sprocket wheel 36 which is connected to the sprocket wheel 37 of the motor 22 by the sprocket chain 38 and the brake drum 39 which cooperates with the brake shoe 40 pivotally mounted on the arm 41 of the bell crank 42 pivoted at 43 to the extension 44 of the base plate 27. The free end of the arm 45 of the bell crank 42 is connected by the spring 46 to the abutment 47 formed on the bracket 48, connected to the extension 44. The arm 45 is pivotally connected to the armature 49 operatively mounted in the spool 50 of the solenoid 51.

Between the cheek plate 29 and the side wall 5, on the cam shaft 23, there is mounted the drum 52 having a depressed portion 53 in its periphery and a pivot pin 54 eccentrically connected to its outer face, which pin 54 in turn is connected to the link 55 operatively connected to the counter 56 mounted on the front face of the upright 31.

Between the cheek plates 28 and 29, on the cam shaft 23, there is formed the extended eccentric cylinder 57 for receiving the claw 58 of the punch 24 and adjacent to cheek plate 29 on the cam shaft 23 there is also formed the eccentric cam disk 59 for cooperating with the cam roller 60 of the printing mechanism 26.

Punch 24

The punch 24 is provided with a lever 61 which has the claw 58 aforesaid at its one end receiving the eccentric drum 57 and is pivotally connected at 62 to the bracket 63 fixedly mounted on the rack bar 64. The rack bar 64 has teeth or cogs 65 at its lower edge in mesh with the worm 66 mounted on the shaft 67 journaled in the bracket 68 which is secured to the cheek plate 28. The rack bar 64 is slidably mounted in this bracket 68 and in the bracket 69 secured to the cheek plate 29. The rack bar 64 is positioned according to the position of the notch or recess 70 to be cut in the lower edge of a pass, such as the pass 71 illustrated in Fig. 11. In the present instance, the shaft 67 of the worm 66 has fixed thereon the beveled gear 72 in mesh with the beveled gear 73 on the shaft 74 journaled in the extension 75 of the bracket 68. The shaft 74 is also journaled in the upright 30 having fixed thereon the gear 76 in mesh with the gear 77 on the shaft 78 journaled in the upright 30. The shaft 78 has mounted thereon the disk 79, provided with a handle 80 for rotating the same. As a guide for the disk 79, its shaft 78 has fixed thereon the gear 81 in mesh with the gear 82 secured to the dial 83 which is fixed on the shaft 84 journaled in the upright 30. The dial 83, see Fig. 10, has a succession of numerals 85 on the same, thirty or more in number, to correspond to the number of positions on the pass 71 that may be notched as at 70. These numerals 85 are positioned so that one of them will register with the pointer 86 mounted on the upright 30, according to the position of the notch to be punched on the pass 71. The lever 61 of the punch 24 has an upper arm 87 provided with an elongated slot 88 in which is received the pin 89 of the male punching die 90, which is slidably mounted in the recess 91. In the bracket 63 between the pin 89 and the rear wall 92 of the recess 88, there is formed a flat spring 93 extending from one end of the slot 88. The die 90 is slidable across the slot 94 formed in the bracket 63 to receive the bar 95 fixed to the fork 96, the bifurcation of which received the bar 97 secured at its ends to the abutments 98 extending from the shaft 99 which is parallel to the bar 97.

When the bar 95 clears the slot 94 and the lever 61 is actuated for a punching operation, the male die 90 is ejected into the female die 100 to cut the notch 70 in the pass 71. When the jaw 58 is actuated to cut a notch 70, it engages the spring 93 in turn to actuate the pin 89 to advance the male die 90, the resistance of the pass 71, causing the spring 93 to be vertically held between the rear wall 92 and the pin 89 and then after the pass has yielded to the die 90 to form a cut pellet, the spring 93 will then be free further to advance the male die 90 and thereby positively eject the pellet out of the female die 100.

The upper arm 87, see Figs. 7, 8 and 9, is provided with a shoulder to engage the collar 101 at the end of the stem 102 which extends through the abutment 103 fixed to the stem 102. Between the abutment 103 and the abutment 104 there is tensed the spring 105, the abutment 104 being fixed to the bracket 63 and the stem 102 extending through the abutment 104 and being provided with a head 106 at the free end thereof to extend across the slot 94 and engage the pass 71 immediately that the machine is started to record the data on a pass 71 or test a pass 71.

The lever 61 in view of the foregoing thus not only actuates the male die 90 but also retracts the stem 102 and therewith the head 106 out of pass anchoring position and in turn liberates the stem 102 to be actuated by its spring 105 into gripping position of a pass 71 when the lever 61 is actuated at the beginning of a cycle preparatory to advancing the male die into position for notching a pass 71. Furthermore, the gripping head 106 of the stem 102 will be maintained in gripping position of a pass 71, until the pass 71 has been properly tested, punched and a record of the same reproduced before the gripping head 106 again releases the pass 71.

Pass testing

Before the machine can be operated, it will be necessary that the pass 71 will satisfy a predetermined code. In the present instance, the code is characterized by more than one conformation formed along various predetermined positions on the edge of the pass, which conformations will register with projections at positions corresponding to the positions of the predetermined notches or recesses. When the notches of the pass presented to the machine correspond to the position of the projections, they will close at least two actuation initiation switches which initiation switches however will immediately be de-energized or de-activated, and in place thereof a solenoid controlling switch and an auxiliary switch actuated replacing said two initiation switches.

To the crosspiece 32 there is secured a pass guide or frame 107, the mouth 108 of which registers with the opening 109 formed in the cover plate 15. The guide 107 has two extensions 110 and 111. Adjacent the extension 110 there is formed a projection 112 formed on the end of the lever 113 pivotally mounted in the extension 114 of the bracket 68, which lever 113 and projection 112 are yieldably maintained in raised position by the hairpin spring 115 wound around a pin 116 on the extension 114, with one arm 117 fixed to the extension 114 and the other arm 118 secured to the pin 119 which extends through the opening 120 in the extension 114 and is confined or controlled in its movement by said opening 120. The projection 112 is preferably disposed in alinement with the notch 121, see Fig. 11. Adjacent the lower end of the extension 111 of the frame 108, there is formed a second projection 122 at the end of the lever 123 pivotally mounted at 124 to the bracket 69. Attached to the lever 123 is the bar 125 normally resting on the button 126 of the switch 127, such as a micro switch. The button 126 in the conventional manner is maintained in projected position supporting the lever 123 in raised position.

For cooperation with the projection 122, the pass 71 is provided with the notch 128, the position of which is predetermined to correspond to the position of the projection 122. The projection 112 in the present instance is a dummy, located adjacent the extension 110 more or less to counter-balance the pass 71 when its other end engages the projection 122. So far as concerns its counterbalancing function, the projection 112 could of course be placed at a different level to cooperate with an intact edge of the pass 71 and not require the recess 121.

However, to cooperate with the projection 122 to establish the current to the motor 22, see Figs. 1, 2 and 13, the intact advance edge 129 of the pass 71 will cooperate with the projection or bar 95, Figs. 7 and 8. In other words, if the notches 121 and 128, Fig. 11, register with the projections 112 and 122, and the advance edge 129 of the pass 71 is otherwise intact, the advance edge 129 will actuate the bars 95 and 97 to rock the shaft 99 and the portion of the pass 71 inside of the notch 128 will actuate the projection 122 to operate the switch 127. The rocking of the shaft 99 will actuate the lever 130 in turn to actuate the roller 131 of the switch 132, such as a microswitch. When both switches 127 and 132 are closed, see Fig. 13, the current will flow from one of the terminals 133 of the source of current by means of the conductors 134 and 135 to the motor 22 and to the other terminal 136 of the source of current from the motor 22, by means of the conductors 137, 138 and 139 to the switch 127, then by means of the conductor 140 to the switch 132 and then by means of the conductors 141 and 142 to the other terminal 136 of the source of current.

The moment the current is so established in the motor 22, the current will also be established in the solenoid 51, the current then passing from the terminal 133 by means of the conductors 134, 143 and 144 to the solenoid 51 and from the solenoid 51 by means of the conductors 145, 138 and 139 to the switch 127, by means of the conductor 140 to the switch 132, and by means of the conductors 141 and 142 to the other terminal 136. When the current is established in the solenoid 51, Fig. 16, its armature 49 will be attracted to actuate the bell crank 42 in turn to withdraw the brake shoe 40 from the brake drum 39 and thereby liberate the cam shaft 23 to be freely actuated by the motor 22.

Immediately after the rotation of the shaft 23 is initiated, the low spot 53 in the drum 52 will clear the roller 146 of the switch 147, such as a microswitch, and the high periphery 148 of the drum 52 will engage the roller 146 and close the switch 147. The roller 146 will remain in contact with the high periphery 148 until the completion of a cycle, during which time the roller 146 so depressed will continue, not only to effect the establishment of the current in the motor 22, but also the establishment of the current in the solenoid 51, Fig. 13. As an instance, when the switch 147 is closed by engagement of the roller 146 with the high periphery 148, the current will pass from the terminal 133 of the source of current through the conductors 134 and 135 to the motor 22 and from the motor 22 through the conductors 137, 138 and 149 to the switch 147, and from the switch 147 by means of the conductors 150 and 142 to the other terminal 136 of the source of current. In turn, the current to the solenoid 51 will pass from the terminal 133 of the source of current by means of the conductors 134, 143 and 144 to the solenoid 51 by means of the conductors 145, 138 and 149 to the switch 147 and by means of the conductors 150 and 142 to the other terminal 136 of the source of current. Consequently, after the pass 71 has been punched by the male die 90, Figs. 7 and 8, and the bar 97 is consequently free to rise, so far as the pass 71 is concerned, the interruption of the current by the opening of the switch 132 will not affect the rotation of the motor 22 nor the liberation of the brake drum 39.

As a matter of fact, the bar 97 will even then not be free to rise until the linkage 151, Fig. 16, has been actuated by the depressed portion 152 of the internal cam 153 formed in the drum 52. The depressed portion 152 is substantially coterminous with the depressed portion 53 on the outside of the drum 52 and the raised portion 154 substantially coterminous with the high periphery 148 of the drum 52. The linkage 151 is substantially identical to the corresponding linkage disclosed in United States Letters Patent No. 2,799,337, dated July 16, 1957, of the present applicant and consists essentially of a link 155 pivotally connected at 156 to the cheek plate 29. This link 155 has a roller 157 at one end in engagement with the faces 152 and 154 of the internal cam. The other end of the link 155 is pivotally connected to the link 158, which is pivotally connected to the arm 159 fixed to the shaft 99. The arm 159 is connected by the spring 160 to the abutment 161 secured to the cheek plate 29.

In view of the foregoing, so long as the roller 157 engages the raised portion 154 of the internal cam, the bar 97 will be maintained in its depressed position even though the pass 71 has been punched or notched at 70 and the portion of the pass 71 formerly in the path of movement of the bar 97 removed. The bar 97 will be so maintained in depressed position until the depressed portion 152 of the cam is brought into engagement with the roller 157 of the link 151, whereupon due to the urge of the spring 160, the linkage 151 will actuate the shaft 99 in turn to raise the bar 97 into its normal position, and at the same time also actuate the lever 130 into the position shown in Figs. 1, 2 and 14, where the depressed portion 162 receives the roller 131 and permits the same to be deflected outwardly into circuit breaking position of the switch 132.

Printer 26

The printer consists essentially of a shaft 163 mounted in the cheek plates 34 and 35 of the frame 21 on which are rockably mounted the arms 164 and 165. These arms 164 and 165 are spaced from one another, see Fig. 3, and are pivotally connected at their upper ends to the platen frame 166 between them having at its rear or striking end a platen bar 167. Forwardly of the bars 164 and 165 the frame 166 has outward extensions 168 and 169 to which are pivotally connected the links 170 and 171, respectively, the lower ends of which are pivotally connected to the cheek plates 34 and 35, respectively. The extensions 168 and 169 are connected by the springs 172 and 173 to the cross rod 174 extending from one cheek plate 34 to the other cheek plate 35 at the rear end of the frame 166.

Adjacent the outer side of the arm 165 there is fixed the arm 175, having at its outer end the cam roller 60 in position to engage the cam 59 on the cam shaft 23. The cam 59 is formed to enable the cam roller 60 to drop into the depressed portion 177 after the shaft has completed about ninety degrees or one-quarter of a revolution when the springs 172 and 173 will be free to advance the platen bar 167 into printing position.

To facilitate forming an impression on the paper record sheet 178, there is provided a roll of carbon paper 179, mounted on the shaft 180, extending from one arm 181 to the other arm 182 of the platen frame 166. From the roll 179 the carbon sheet 183 passes around the platen bar 167 and over the same to the take up roll 184 mounted on the shaft 185 similarly extending from one arm 181 to the other arm 182. Adjacent the pass 71, when positioned in a guide 107, there extends the paper 178 it passing up from the supply roll 186 mounted on the shaft 187 journaled in the arms 188 extending upwardly from the crosspiece 189 of the frame 190, the free ends of the arms 188 being pivotally connected to the free ends of the links 191 which are pivotally connected to the cheek plates 34 and 35, and resting on the projections 192 extending from the cheek plates 34 and 35 when in operative position.

From the roll 186 the sheet of paper 178 passes around the guide rod 193 and rearwardly across the guide rod 194 and then down around the guide rod 174 to and over the rod 196 and then down in engagement with the rollers 197 and 198 between the feed rollers 199 and 200, discharging down beyond the base 33. The feed roller 200 is journaled on the ends of the bars 201, which are slidably mounted in the brackets 202. The bars 201 are connected to one another by the rod 203 which in turn are connected by the springs 204 to the rod 205 on the brackets 202 yieldably to maintain the roller in feeding engagement with the roller 199. The rollers 199 and 200 are drivingly connected to one another by the gears 206 and 207, respectively, see Fig. 4, which gears 206 and 207 are in mesh with one another and connected to the pawl and ratchet mechanism 208 drivingly connected to the link 209 which is pivotally connected to the arm 210 fixed to the arm 164. Consequently, whenever the arms 164 and 165 are returned by the operation of the cam 59 and the cam roller 60, the feed rollers 199 and 200 will be actuated to feed the paper 178 a distance predetermined corresponding to a line space to present a fresh line or surface of the paper 178 to the carbon 179 and adjacent platen bar 167.

Simultaneously with the feed of the paper 178 by the pawl and ratchet mechanism 208, the carbon paper 179 will also be fed through the cooperation of the pawl 211 with the ratchet 212 fixed to the shaft 185 of the take up roll 184 of the carbon paper 179. Preferably the feed of the carbon paper 179 per cycle is much less than the feed of the paper 178 per cycle.

To facilitate access to the carbon paper 179 and the working parts of the printing mechanism, as shown in Fig. 4, the paper roll 186 in the frame 190 with the aid of the links 191 and 192 may be swung upwardly where the links 191 and 192 rest on the tie rod 194.

When the section 21 is positioned in the section 19, where the cam roller 60 on the arm 175 engages the periphery of the cam 59, and the set screws 213 on the section 19 enter the recesses 214 and firmly grip the section 21 and the plate 15 is secured to the casing 1, the machine is ready for operation.

In the operation of the machine it will be seen that the gripping head 106, see the diagram in Fig. 15, will grip the pass immediately that the current in the motor 22 is established and the pass grip 106 not again withdrawn until the pass has been punched and the record impressed upon a record receiving strip so that the pass cannot with facility be removed from the machine before the pass is tested and punched and a record of the same impressed on a record receiving strip.

It will also be seen from the aforesaid that due to the fact that a plurality of switches must be closed by one and the same pass before the machine can operate, that successful tampering with the machine is made considerably more difficult.

It would also appear from the aforesaid, due to the fact that pellets punched out of the pass are positively ejected from the female die, that jamming of the machine due to the blocking of the female die will be positively eliminated and consequently the machine in this respect also made materially more fool-proof than with machines where such jamming can be effected.

Since the pass is conventionally designated a ticket, it is understood that when the term "ticket" is used in the claims it refers to the pass 71.

One of the main achievements of the present invention resides in the fact—after the pass 71 has been punched, the record of the same reproduced, the lever 130 actuated to enable the switch 132 again to be opened, thereby in turn also to interrupt the current through the switch 127, and the gripping head 106 retracted out of gripping engagement with the pass 71—that the projections 112 and 122 will be free to rise, the projection 112 under the influence of the spring 115 and the projection 122 under the influence of the spring pressed button 126. When the projections 112 and 122 are so released they will in turn react on the pass 71 to eject the same.

The projection 112 thus not only serves to cooperate with the projection 122 to eject the pass 71 at the completion of a cycle, but also serves to cooperate with a dummy recess 121 in the pass 71, thereby further to confound a wrongdoer. In other words, the leading or advance edge 129 has a dummy notch 121 which does not function to actuate a switch, a notch 128 which will function to actuate a switch 127 and an uninterrupted intact portion of the leading edge 129 which will function to actuate the bars 95 and 97 to rock the shaft 99 and close the switch 132.

It is obvious that various changes and modifications may be made to the details of construction without departing from the general spirit of the invention as set forth in the appended claims.

I claim:

1. In an admission pass manipulating machine, the combination of an authorized pass having a leading edge, a frame, a guide mounted in said frame for receiving said pass, a main obstruction movably mounted in the path of movement of said leading edge, a second obstruction movably mounted in said frame also in the path of movement of said leading edge, a spring pressed switch normally positioning said second movable obstruction in advanced position in the path of movement of said leading edge, a drive shaft mounted in said frame, a motor operatively connected to said drive shaft, a first cam on said drive shaft, a lever mounted on said frame, a pass gripper slidably mounted on said lever, a spring on said lever urging said pass gripper into gripping engagement with said pass, a bracket mounted on said frame, a punch slidably mounted on said bracket and operatively connected to said lever, a source of current, a main switch operatively connected to said main obstruction, a first wiring connecting said source of current, switches and motor to initiate the actuation of said main drive shaft, when both said obstructions are actuated to close said switches to initiate a cycle of operation and actuate said first cam to actuate said lever in turn to enable said spring to actuate said pass gripper into gripping engagement with said pass, a third switch, a second cam operatively connected to said drive shaft and operatively associated with said third switch, a second wiring connecting said third switch with said motor and source of current to establish a second circuit to said motor, a third cam operatively connected to said drive shaft, a linkage operatively connecting said third cam to said main movable obstruction, the continued actuation of said third cam during the completion of its cycle successively maintaining said main obstruction in switch closing position, in turn the continued actuation thereupon of said first cam actuating said lever in turn to actuate said punch, restore said punch, restore said pass gripper, and the continued actuation in turn of said third cam releasing said main movable obstruction in turn to open said first switch and said second switch to enable said second movable obstruction to eject said pass from said guide, and upon the further actuation of said second cam finally open said third switch.

2. The combination as set forth in claim 1 in which said second movable obstruction is disposed in said frame adjacent one end of said leading edge and a third movable obstruction is disposed in said frame adjacent the other end of said leading edge, a spring normally maintaining said third movable obstruction in the path of movement of said leading edge and compressed when said pass is inserted into said guide, said third movable obstruction under the tension of said spring co-operating with said second movable obstruction to eject said pass from said guide when said gripper is withdrawn from engagement with said pass.

References Cited in the file of this patent

UNITED STATES PATENTS

| | | |
|---|---|---|
| 1,493,994 | Le Fere | May 13, 1924 |
| 2,556,936 | Munschauer | June 12, 1951 |
| 2,562,702 | David | July 31, 1951 |
| 2,581,960 | Kronenwetter | Jan. 8, 1952 |
| 2,601,898 | Vestorsky | July 1, 1952 |
| 2,741,979 | Arcus | Apr. 17, 1956 |
| 2,741,980 | Arcus | Apr. 17, 1956 |
| 2,799,337 | Arcus | July 16, 1957 |